United States Patent [19]
Tsunetomo et al.

[11] Patent Number: 5,951,731
[45] Date of Patent: Sep. 14, 1999

[54] LASER PROCESSING METHOD TO A MICRO LENS

[75] Inventors: Keiji Tsunetomo; Tadashi Koyama, both of Osaka, Japan

[73] Assignee: Nippon Sheet Glass Co., Ltd., Osaka, Japan

[21] Appl. No.: 08/943,803

[22] Filed: Oct. 3, 1997

[30] Foreign Application Priority Data

Oct. 24, 1996 [JP] Japan .................................. 8-282362

[51] Int. Cl.⁶ ........................... C03B 23/00; C03B 23/04; C03C 21/00
[52] U.S. Cl. .................... 65/61; 65/111; 65/112; 65/105; 65/392; 219/121.66; 219/121.71; 264/1.37; 359/900
[58] Field of Search ................................ 65/61, 111, 112, 65/105, 392, 56; 219/121.6, 121.85, 121.7, 121.71, 121.65, 121.66, 121.75; 264/1.37; 359/900

[56] References Cited

U.S. PATENT DOCUMENTS 4,172,219  10/1979  Deml et al. .

FOREIGN PATENT DOCUMENTS

| | | |
|---|---|---|
| 2-33105 | 2/1990 | Japan . |
| 5-11134 | 1/1993 | Japan . |
| 5-333232 | 12/1993 | Japan . |
| 7-244222 | 9/1995 | Japan . |
| 7-248428 | 9/1995 | Japan . |

*Primary Examiner*—Steven P. Griffin
*Attorney, Agent, or Firm*—Merchant, Gould, Smith, Edell, Welter & Schmidt P.A.

[57] ABSTRACT

For forming bores for insertion of optical fibers, etc., on one side surface of a micro lens with high accuracy and easy work, a laser processing method that includes the steps of: irradiating a laser beam onto the one side surface of the micro lens; then focusing the laser beam in a layer having superiority in absorbency with respect to the laser beam; and forming the bores because the laser beam exceeds the threshold value of causing fusion, evaporation or ablation in the superior laser beam absorption layer.

11 Claims, 11 Drawing Sheets

FIG. 4A  LAYER HAVING HIGH CONCETRATION OF SILVER ION

LASER PROCESSING METHOD TO A MICRO LENS

BACKGROUND OF THE INVENTION

1. Field of the Invention

The present invention relates to a laser processing method for forming bores onto a micro lens of a rod-like or a plate-like shape (including a micro lens array having plural lens portions thereon), which bores are provided for inserting optical fibers therein or for adjusting an optical axis thereof.

2. Description of Related Art

Optical communication is able to transfer a large amount of information at high speed, therefore, it has been widely used in various technical fields, for example as main circuits for telephone communication, as circuits for constructing LANs (Local Area Network) or for data transmission among a plurality of devices. A medium for transmitting signals in such optical communications is the optical fiber.

The signal (light) which is generated by a light emitting element, such as a laser diode, for use in optical communications is focused and guided into the optical fiber and transmitted to a signal receiving portion through the optical fiber. At the signal receiving portion, the optical fiber is connected to a light receiving element, such as a photo diode, for reconverting the optical signal into an electric signal.

For the purpose of connecting the optical fiber to the light emitting element or to the light receiving element, a so-called micro lens is used. In more detail, the light generated from the light emitting element can be focused onto the diameter of the optical fiber and introduced thereinto through the micro lens with high efficiency. Additionally, also at the signal receiving side, though the light emitted from the optical fiber has a divergent angle of a certain spread, it can be effectively focused onto a light receiving surface of the light receiving element by use of the micro lens.

It should be noted that for the purpose of introducing the light into the optical fiber and for its emission therefrom, the focal point of the micro lens must be effectively and precisely positioned on the core of the optical fiber.

However, though the diameter of the core of the optical fiber depends on the kind thereof, it is a few or several $\mu$m in the case of a single mode optical fiber of quartz, for example. Therefore, a stage device which moves with a very fine accuracy and a relative long time is necessitated for adjusting the core onto the focal point of the lens.

A technology for adjusting the core by using convexoconcave insertion is disclosed for example in Japanese Laid-Open Patent No. Hei 5-333232 (1993), Japanese Laid-Open Patent No. Hei 5-11134 (1993), Japanese Laid-Open Patent No. Hei 7-244222 (1995), Japanese Laid-Open Patent No. Hei 7-248428 (1995) and Japanese Laid-Open Patent No. Hei 2-33105 (1990), etc.

Figure 14:
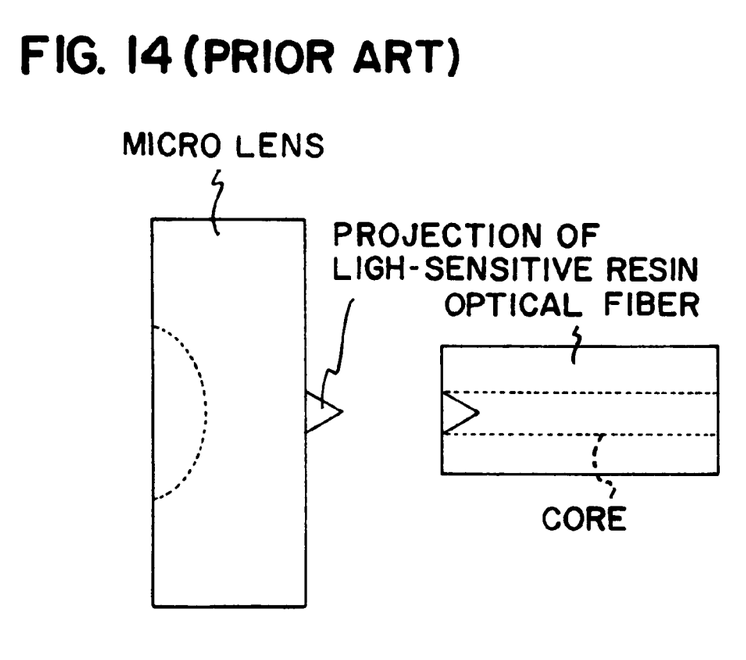
FIG. 14 is a drawing which shows the conventional processing method.

What is disclosed in Japanese Laid-Open Patent No. Hei 5-333232 is, as shown in FIG. 14, that a light sensitive resin is painted on an opposing surface of a plate-like micro lens, and that only the light sensitive resin at the focal point is hardened by exposure via light entering from the lens surface. Thereafter, a projection remains after development and this projection is inserted into a recess portion formed on a front edge of the optical fiber so as to be coupled therewith.

What is disclosed in Japanese Laid-Open Patent No. Hei 5-11134 is that bores for insertion are drilled at core portions of an optical wave-guide, by use of a micro drill, micro end-mill and an electrodeposition grindstone.

What is disclosed in Japanese Laid-Open Patent No. Hei 7-244222 and Japanese Laid-Open Patent No. Hei 7-248428 is that a concave portion is formed by suppressing a heated diamond pressure element of a ring shape, and that into the concave portion is inserted a convex portion which is formed on the front edge surface of the optical fiber.

Further, what is disclosed in Japanese Laid-Open Patent No. Hei 2-33105 is that, by transmitting a monitor light incident into the core layer from an end surface of the core layer of the optical wave-guide and by referencing the monitor light emitted from the other end surface of the optical wave-guide, a $CO_2$ laser beam is superposed on the monitor light so as to form the concave for inserting the optical fiber in the core portion.

In addition, the method shown in Japanese Laid-Open Patent No. Hei 5-333232 has drawbacks in that the projecting portion made of the light sensitive resin is deteriorated when it is used for a long time or under a high temperature; that the production process takes time and is expensive since it includes many steps, i.e., painting of the light sensitive resin, exposure and development and so on; and further in that undesired refraction occurs on a border or a boundary between the projection and the glass used to construct the micro lens and the optical fiber, since it differs from them in the type of material.

All of the methods disclosed in Japanese Laid-Open No. Patent Hei 5-11134, Japanese Laid-Open No. Patent Hei 7-244222 and Japanese Laid-Open Patent No. Hei 7-248428 are not suitable for mass production since they each require fine machining processes, and further the method disclosed in Japanese Laid-Open Patent No. 2-33105 has a drawback in that it takes a very long time and further has poor productivity since the concave is processed by finely adjusting the position of the micro lens on the stage device by very fine movements, and by ascertaining the focal point by referencing the monitor light.

SUMMARY OF THE INVENTION

For resolving the problems mentioned above, in accordance with the present invention, there is provided a laser processing method for forming a plurality of bores onto a micro lens, comprising the steps of: irradiating and focusing a laser beam onto one end surface (or one side surface) of said micro lens, the strength of the laser beam being higher than a threshold value that will cause fusion, evaporation or ablation in a glass material comprising the micro lens; focusing the laser beam onto an optical axis on the other end surface (or the other side surface) of the micro lens; and forming at least one bore by causing the fusion, evaporation or ablation at the optical axis on said other end surface (or said other side surface) of the micro lens.

Additionally, the micro lens includes a micro lens having a rod-like shape which has a refractive index distribution in a radial direction, and a micro lens having a plate-like shape which has one or plural lens portions on a surface or inside thereof, being aligned in one or two dimension.

Further, it is preferable to provide a portion which has superior laser beam absorbency on the surface of the micro lens, on which the fusion, evaporation or ablation is caused.

In more detail, the portion having the superior laser beam absorbency contains silver in the form of Ag atoms, Ag colloids or Ag ions therein, and further it has a variation in the silver concentration such that it has a maximum value at the surface to be processed and decreases gradually therefrom until a predetermined depth thereof.

In the conventional art, though the laser beam which is able to form such bores by being irradiated upon the glass is limited only to the laser beam of wave-length 193 nm from the ArF excimer laser or the $CO_2$ laser, with provision of the portion of superior laser beam absorbency on the micro lens, it becomes possible to also use the laser beams generated from the XeF excimer laser, the Nd:YAG laser and the $Ti:Al_2O_3$ laser including the high harmonics and the light converted in the wave-length thereof, or to use the laser light emitted from the pigment laser.

These laser beams have a low coefficient value in absorbency with respect to the basic material of the micro lens, and therefore, the bores can be formed by a self-alignment by using a light focusing effect of the micro lens itself, without using, for example, a monitor light.

DESCRIPTION OF THE PREFERRED EMBODIMENTS

Hereinafter, detailed explanation of the embodiments according to the present invention and comparisons will be given by referring to the attached drawings.

First Embodiment

Figure 1:
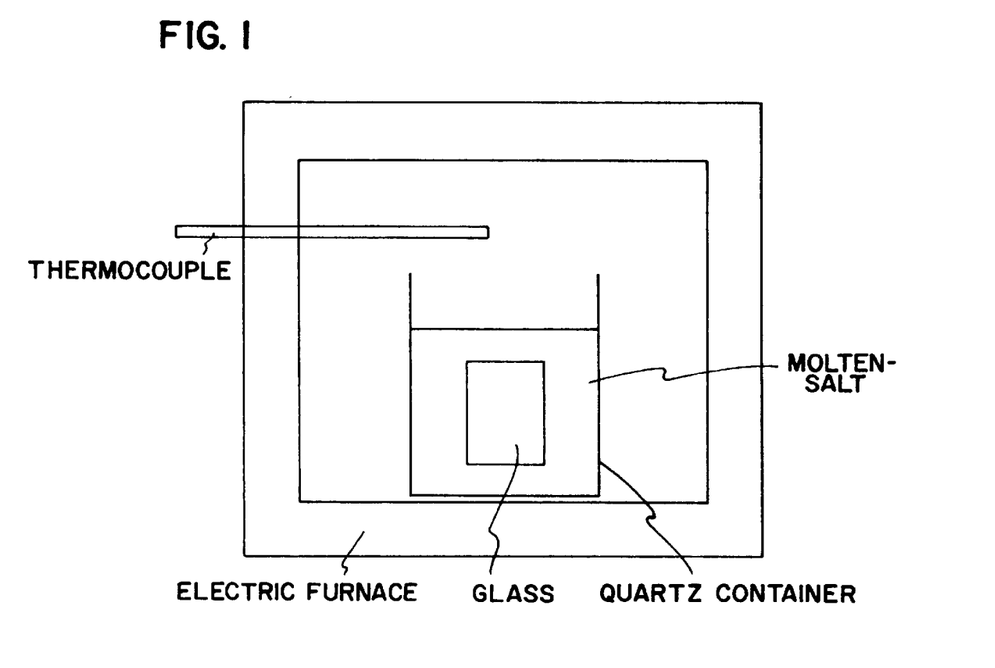
FIG. 1 is a schematic diagram of a device for use in ion exchange in accordance with the present invention.
Figure 2A:
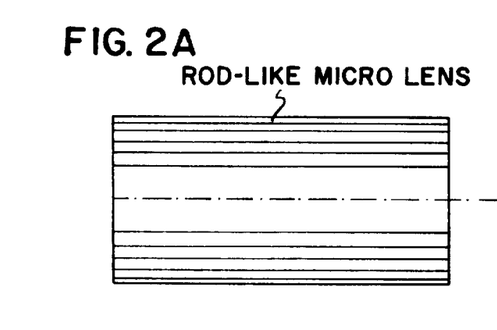
FIG. 2(a) is a cross-section view of a micro lens of a rod-like shape along with the axis thereof, which is processed by the process of the present invention.
Figure 2B:
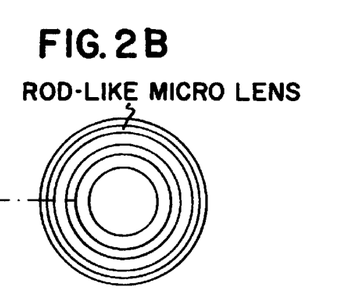
FIG. 2(b) is a cross-section view of the same micro lens in a radial direction.

First of all, an ion exchange is conducted for a micro lens by use of a device as shown in FIG. 1. The micro lens, as is shown in FIG. 2, has a rod-like shape (an outer diameter 1.8 mm and a length 4.5 mm), comprises a glass material, and has a refractive index distribution in a radial direction thereof.

In the device for ion exchanging, a mixture of molten salt of silver nitrate and sodium nitrate at a 50 mol %-50 mol % ratio is filled within a quartz container, and the micro lens mentioned above is dipped in the molten salt, which is kept at a temperature of 300° C. by an electric furnace, for fifteen (15) minutes so as to elute Na ions (a positive ion of a monovalent) on the surface of the micro lens and diffuse Ag ions in the molten salt into the micro lens, thereby forming a layer which shows superiority in absorbency with respect to the aforementioned laser beam, on the surface of the micro lens. The thickness of the layer, into which the Ag ions are diffused, is measured by an X-ray micro-analyzer and is found to be about 5 $\mu$m.

Figure 3A:
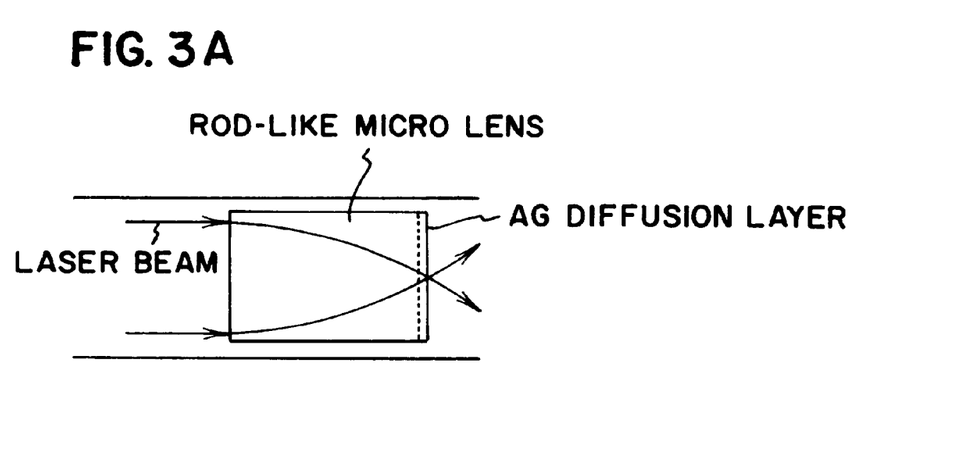
FIG. 3(a) shows a condition of irradiating the laser beam upon the micro lens having a rod-like shape.

Next, as is shown in FIG. 3(a), while the micro lens is set so that the central axis thereof is parallel to the laser beam, the laser beam is transmitted into one end surface of the micro lens.

Figure 3B:
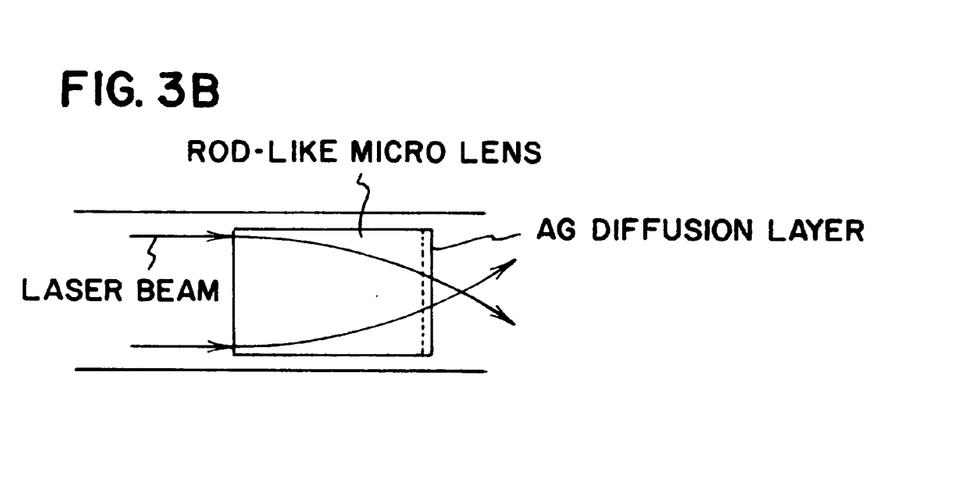
FIG. 3(b) shows another embodiment in which the focal point and the edge surface of the lens differ with respect to each other.

The micro lens has such a refractive index distribution that incident light rays entering in parallel at the one end surface are focused onto the other end surface thereof. However, it is sufficient for the micro lens to merely focus the beam close to the surface thereof, as is shown in FIG. 3(b), and it need not be focused perfectly on the end surface.

However, when diffusing the Ag ions into the micro lens, if it is conducted by covering a mask on portions other than the end surface on which the laser beam is focused, the mask covering on the end surface into which the laser beam is transmitted must be removed afterwards. And, if the ion exchange is conducted under the condition that both end surfaces of the micro lens are exposed, then the Ag diffused layer on the end surface into which the laser beam enters must be removed in a post-processing step, such as by grinding.

The laser beam used here is a second high harmonic (wave-length of 532 nm) of an Nd:YAG laser. The pulse width of the laser beam is about 10 nsec, the repetitive frequency is 5 Hz, the irradiation energy is 0.5 mJ/pulse, and the diameter of the beam is about 6 mm.

When the laser beam is emitted from the one end surface of the micro lens in the manner as mentioned in the above, the laser beam is focused on the other end surface, i.e., in the layer of superior laser beam absorbency, into which the Ag ions are diffused. Then, the energy of the laser beam exceeds a threshold value sufficient for causing fusion, evaporation or ablation to remove some of the glass material under the condition of being focused, thereby forming a bore or bores.

Figure 4A:
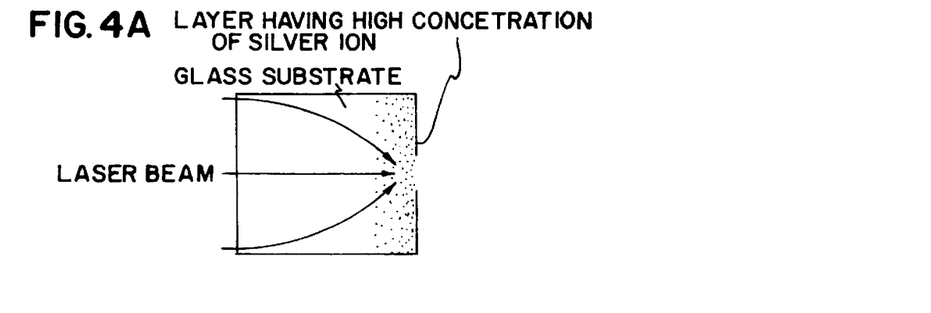
FIGS. 4(a) through (d) show steps in processing the edge surface of the micro lens.
Figure 4B:
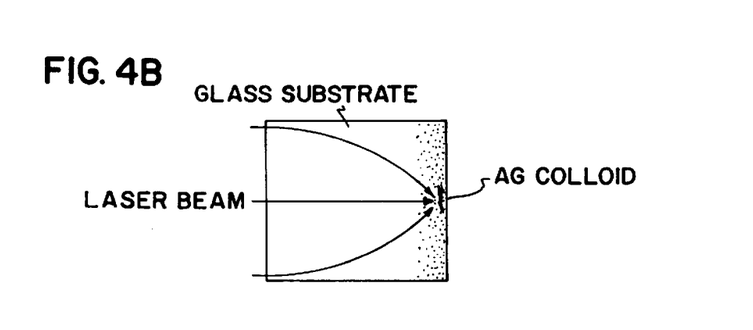
Figure 4C:
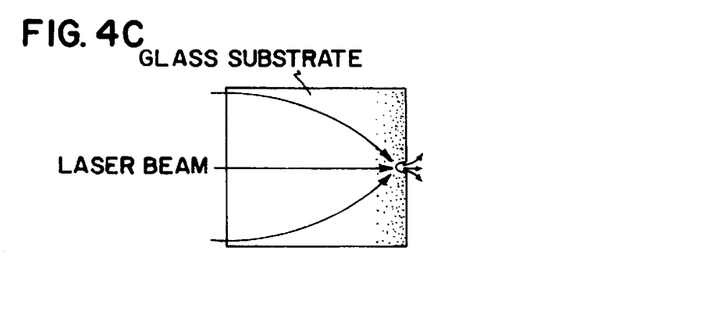
Figure 4D:
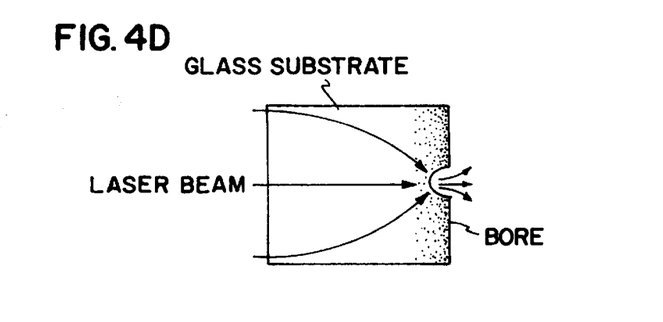

Explaining the above processes on the basis of FIG. 4, first of all, as shown in FIG. 4(a), the laser beam is irradiated from the one end surface of the micro lens. Then, as shown in FIG. 4(b), the silver (Ag ions) on the surface of the glass where the concentration of the silver ion is at the maximum value reduces to a colloid (amicrons or ultra fine particles of Ag) further below the surface. The colloid absorbs the laser beam energy, as shown in FIG. 4(c), causing fusion, evaporation or ablation, and thereby the glass on the surface portion is removed. Further, when the surface portion of the glass is removed, then the same phenomena occur sequentially in the sub-layers thereof, and finally the bores are formed as shown in FIG. 4(d). The size of the bore, which is measured by a laser interference microscope, is found to be about 20 μm in diameter and about 6 μm in depth.

Figure 5:
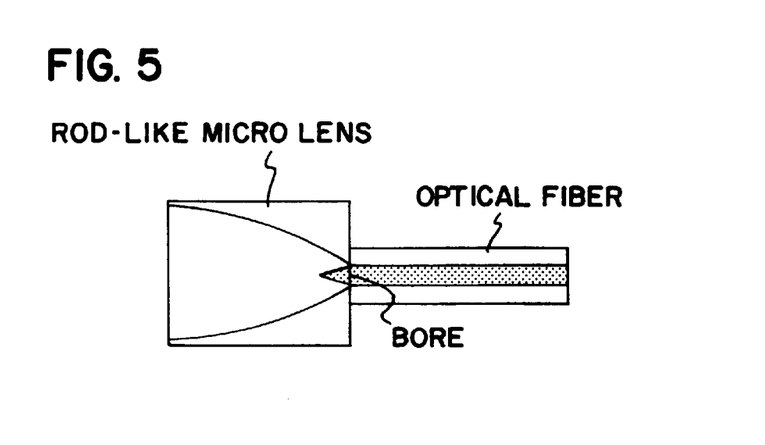
FIG. 5 shows the micro lens connected with an optical fiber after the processing.
Figure 6:
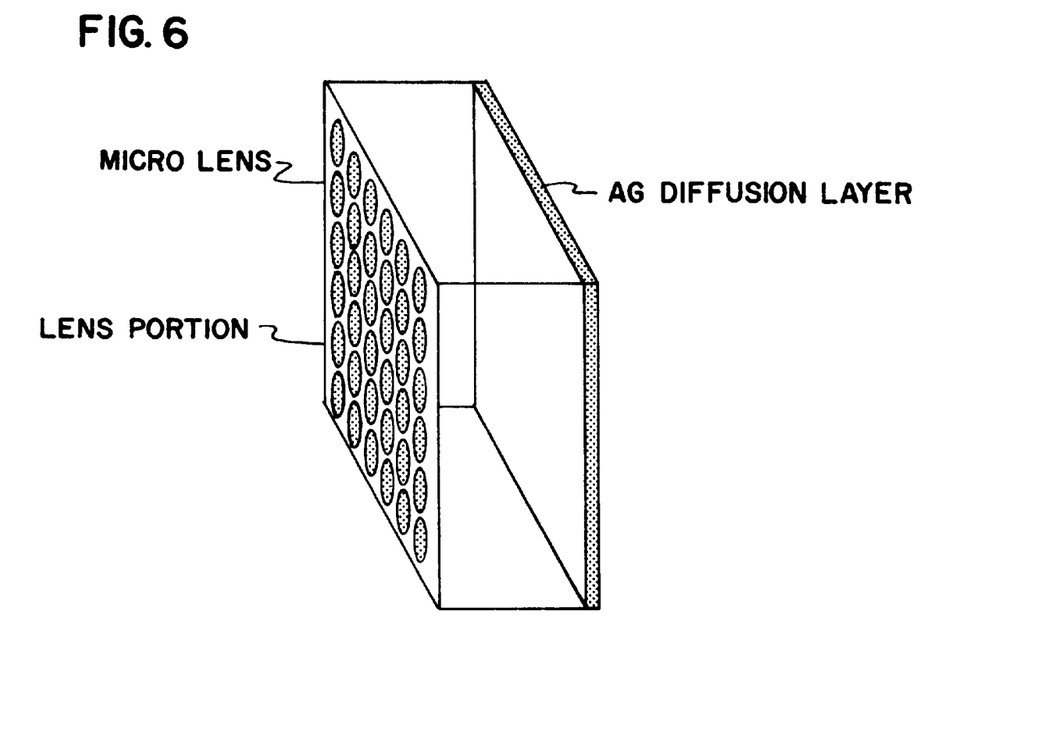
FIG. 6 shows a micro lens having a plate-like shape which is processed by the process of the present invention.
Figure 7A:
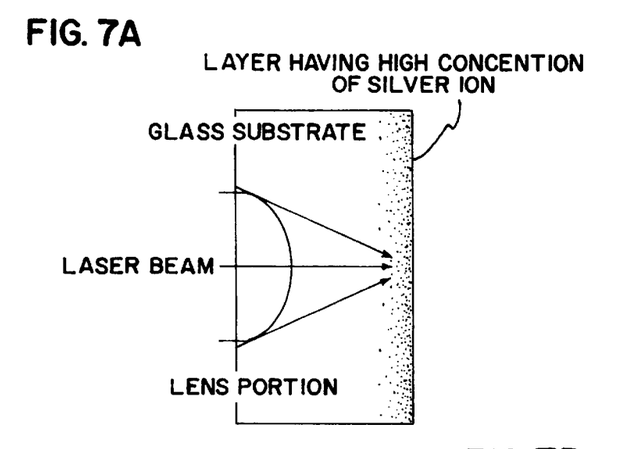
FIGS. 7(a) through (d) show steps in processing the surface of the micro lens having the plate-like shape.
Figure 7B:
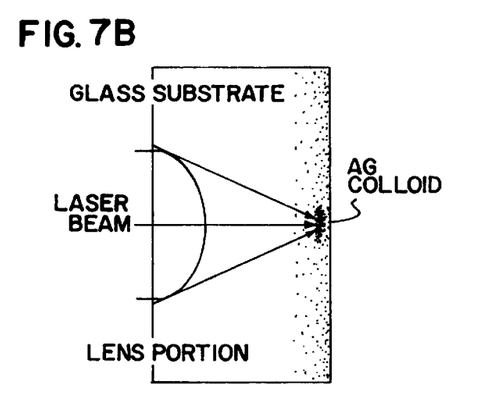
Figure 7C:
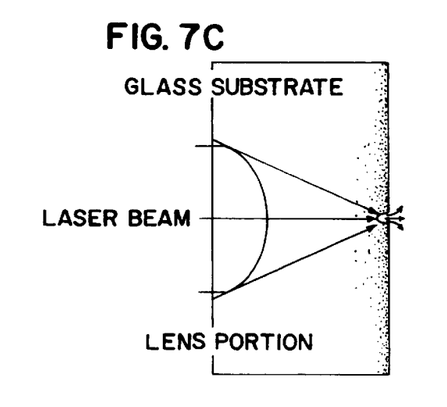
Figure 7D:
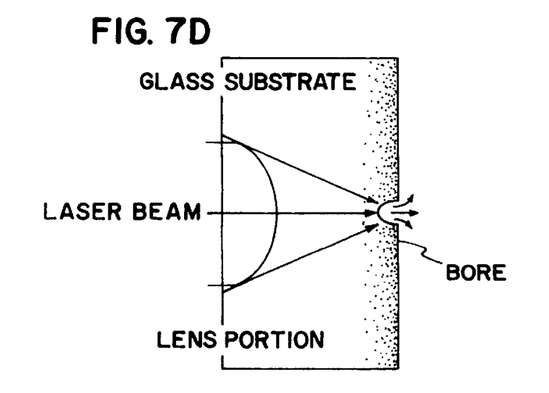

The size mentioned above of the bore is ideal for insertion of the optical fiber, and when transmitting the laser beam from the optical fiber side, as shown in FIG. 5, light (almost collimated in parallel) is emitted from the micro lens.

Embodiment 2

As a micro lens there is prepared a substrate which has a thickness of 1 mm and on a one side surface thereof, there are formed lens portions, the focal length of which is about 1 mm, and on the other side surface, there are formed a plurality of bores in accordance with the steps shown in FIGS. 7(a) through (d).

Figure 8A:
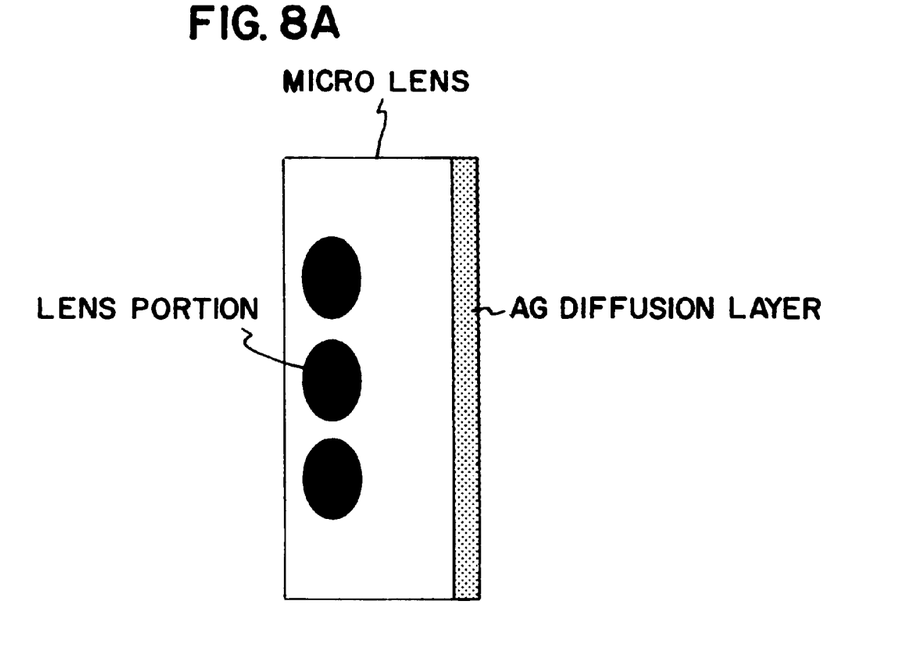
FIGS. 8(a) and (b) show another embodiment of the micro lens of the plate-like shape to be processed.
Figure 8B:
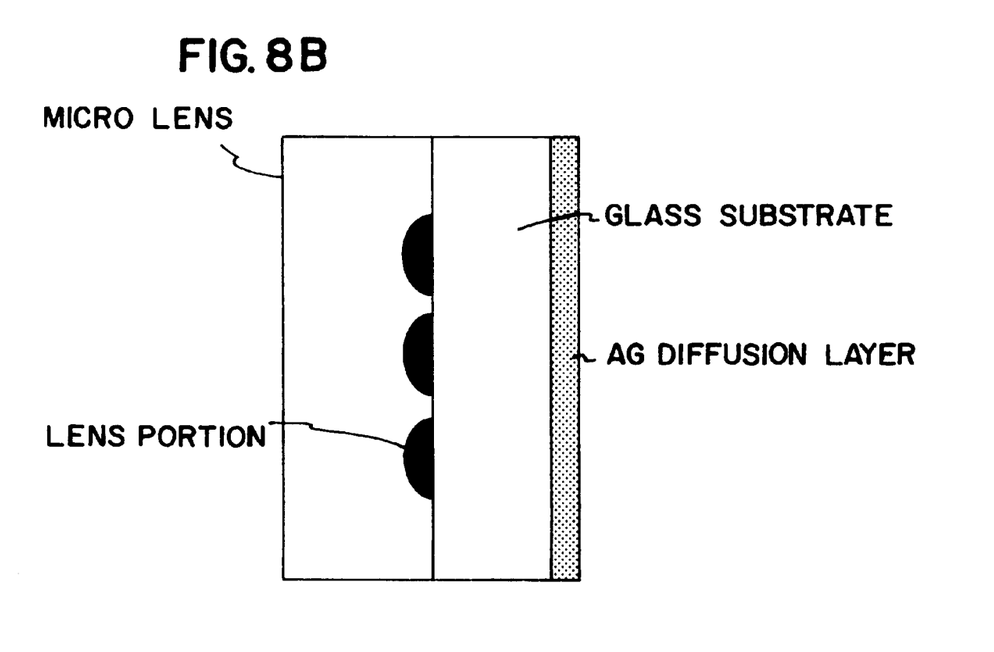

However, as shown in FIG. 8(a) or FIG. 8(b), as the micro lens, there can be used a micro lens in which the lens portions are formed inside of the substrate or on which another substrate is adhered onto the surface forming the lens portions.

Figure 9:
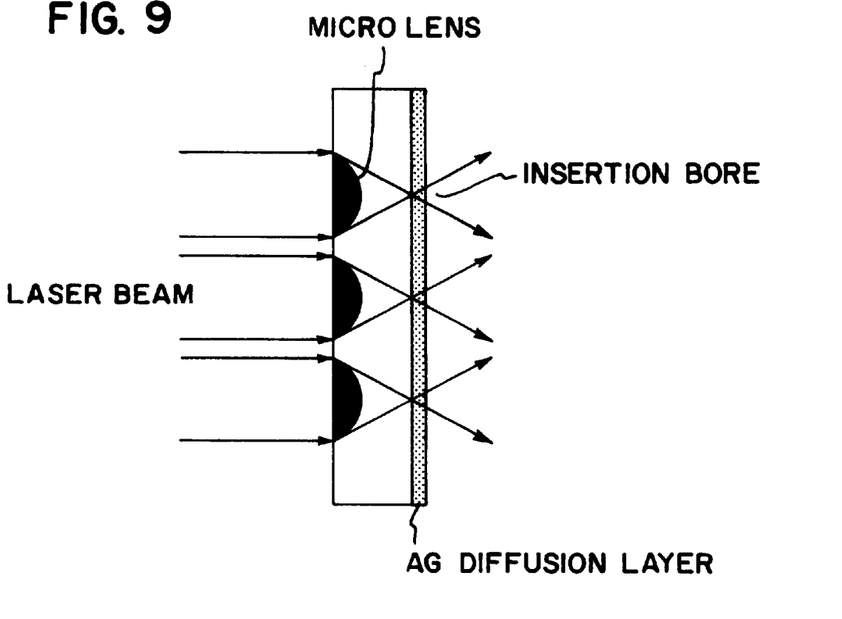
FIG. 9 is a schematic diagram showing a condition of irradiating the laser beam upon the micro lens having the plate-like shape.

Onto the micro lens mentioned above, as shown in FIG. 9, the laser beam is irradiated from the one side surface. Then, the laser beam is focused at the layer of superior laser beam absorbency, and in the same manner mentioned above, the fusion, evaporation or ablation occurs in the superior laser beam absorbency layer, thereby forming the plural bores.

However, since the laser beam is not focused in the portions of the lens portion and the glass substrate, the laser beam does not exceed the threshold energy value sufficient to cause fusion, evaporation or ablation to the surrounding material, therefore no ablation and so on will occur in an unadvantageous location.

Figure 10:
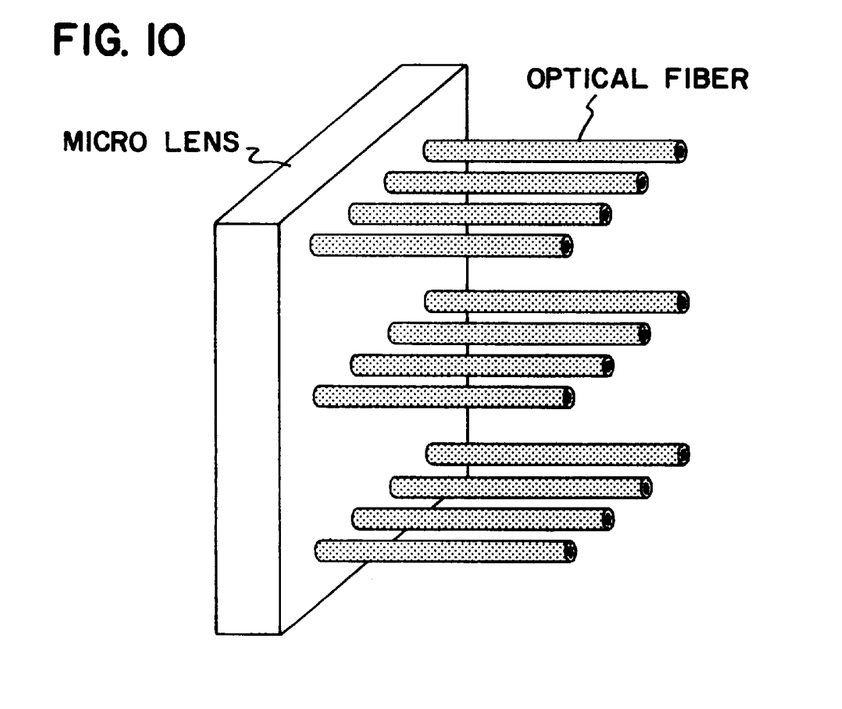
FIG. 10 shows the micro lens having the plate-like shape, which is connected with an optical fiber after the processing.

The size mentioned above of the bore(s) is ideal for insertion of the optical fiber(s), and when transmitting the laser beam from the optical fiber side, as shown in FIG. 10, a light beam that is almost collimated in parallel is emitted from the micro lens.

Figure 11A:
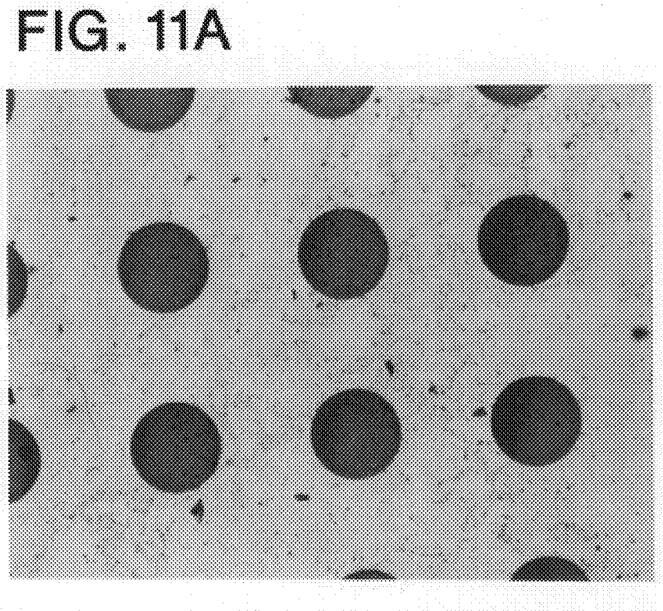
FIG. 11(a) shows a photomicrograph taken by an optical microscope of the micro lens having the plate-like shape (×50)
Figure 11B:
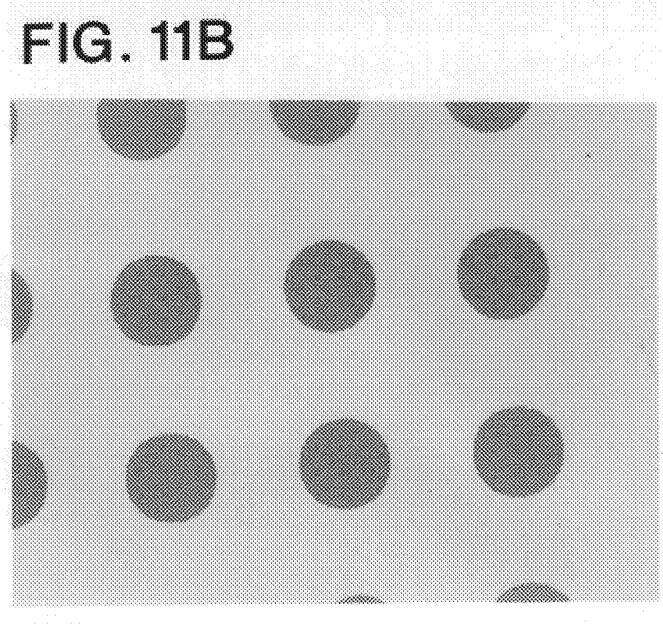
FIG. 11(b) is a drawing produced on the basis of the same photo.
Figure 12A:
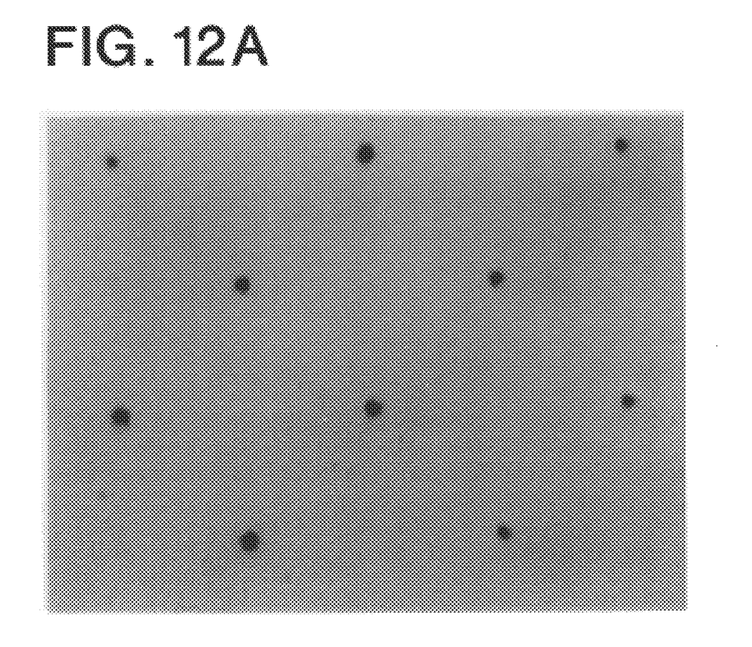
FIG. 12(a) shows a photomicrograph taken by the optical microscope of the bores formed on the micro lens shown in FIG. 10 (×50)
Figure 12B:
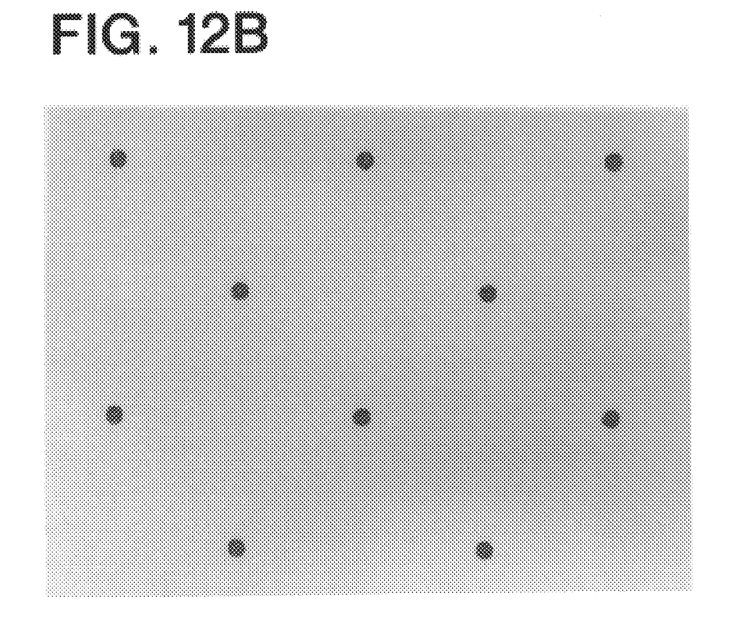
FIG. 12(b) is a drawing produced on the basis of the same photo.
Figure 13A:
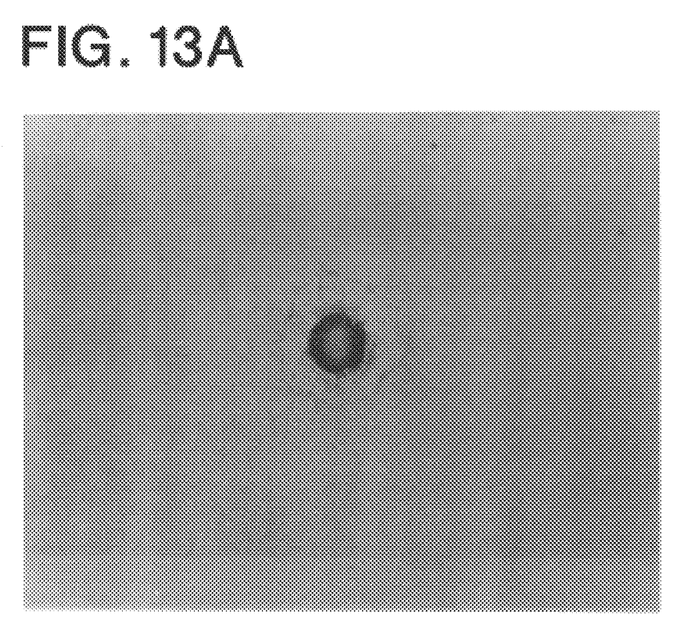
FIG. 13(a) shows a photomicrograph taken by the optical microscope of the bores formed on the micro lens shown in FIG. 11 (×1,000)
Figure 13B:
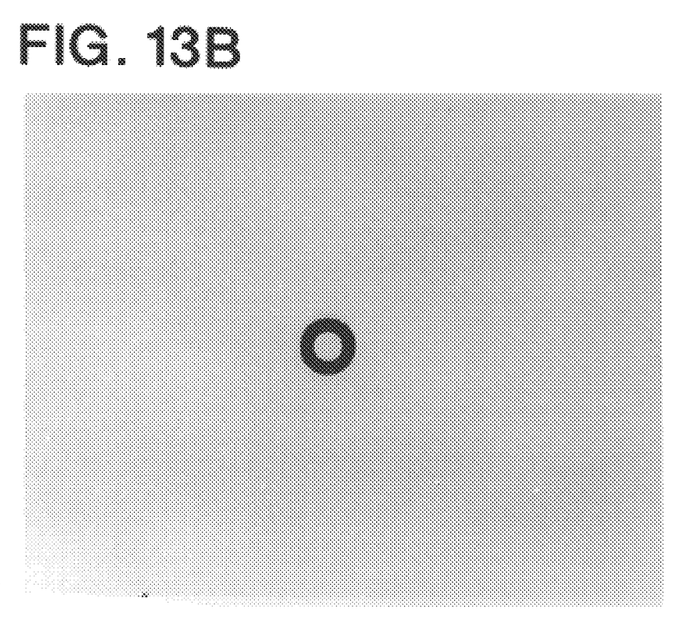
FIG. 13(b) is a drawing produced on the basis of the same photo.

FIG. 11(a) shows a photomicrograph observed by an optical microscope of the micro lens of the plate-like shape (×50) which is supplied for experiment, and FIG. 11(b) is a drawing produced on the basis of the same photo. FIG. 12(a) shows a photomicrograph observed by an optical microscope of the bores formed on the micro lens shown in FIG. 11 (×50), and FIG. 12(b) is a drawing produced on the basis of the same photo. Further, FIG. 13(a) shows a photomicrograph observed by an optical microscope of the bores formed on the micro lens shown in FIG. 12 (×1,000), and FIG. 13(b) is a drawing produced on the basis of the same photo. The size of the bore is found to be about 6 μm in diameter and about 3 μm in depth.

As is apparent from those photos, no damage nor malformation is caused within the lens or the glass substrate, and also no cracking nor breaking off can be found in the periphery of the bores.

However, though in the embodiments mentioned above there is described only a micro lens in which the superior laser beam absorbent layer is formed through ion exchange, with a micro lens which is not processed by the ion exchange, the bores can also be formed depending on the setting of the condition of the laser beam strength and so on.

Further, the use of the bores formed on the micro lens is not restricted to the insertion of the optical fiber described above, but it can also be used as a mark when adjusting the optical axis thereof.

As is explained in the above, in accordance with the present invention, when forming the bores on the optical axis of the micro lens by the laser beam, the bores are formed by the fusion, evaporation or ablation caused by using the focusing effect of the micro lens itself. Therefore very fine bores can be opened at the correct positions by the so-called self-alignment, without using the monitor light mentioned above.

Further, by forming the Ag rich layer which is superior in laser beam absorbency in the portion where the bores should be formed, in advance, even those laser beam sources which could not used for forming such bores in the conventional art can also be used, and these laser beam sources can penetrate through and within the glass material well. Therefore, their use avoids causing damage and so on in the glass.

Moreover, by producing the decrease in concentration of Ag ions and so on, the ablation and so on can be caused from the surface (having a high concentration), directing into the inside sequentially. Therefore, cracking or breaking off hardly occurs.

What is claimed is:

1. A laser processing method for forming bores onto a rod shaped micro lens having a first and second end, which has such a refractive index distribution in a radial direction that almost all of an incident light entering in parallel at the first end of said micro lens is focused onto the second end thereof, comprising the steps of:

forming a laser energy absorbing layer internally to said micro lens at said second end by diffusing said energy absorbing layer a predetermined distance into said micro lens using an ion exchanging process;

irradiating and focusing a laser beam onto the first end of said micro lens, the strength of said laser beam being higher than a threshold value sufficient for causing fusion, evaporation or ablation of a glass material comprising the micro lens;

focusing the laser beam onto an optical axis on the second end of the micro lens in the laser energy absorbing layer; and forming at least one bore by causing the fusion, evaporation or ablation at the optical axis on said second end of the micro lens.

2. A laser processing method for forming bores onto a micro lens as defined in claim 1, wherein said laser energy absorbing layer contains silver in a form of Ag atoms, Ag colloids or Ag ions therein, and further wherein the contained silver has a variation with respect to the silver concentration such that it has a maximum value at said second end where said bore is being formed and decreases gradually therefrom until a predetermined depth.

3. A laser processing method for forming bores onto a micro lens as defined in claim 1, wherein the laser beam is a light beam generated by an excimer laser.

4. A laser processing method for forming bores onto a micro lens as defined in claim 3, wherein the excimer laser is any one of an XeF laser, a Nd:YAG laser and a Ti:Al$_2$O$_3$ laser, the laser beam including high harmonics and a light beam converted in the wave-length thereof; or generated by a pigment laser.

5. A laser processing method for forming bores onto a micro lens as defined in claim 1, wherein said bores have a depth of about 6 microns and a diameter of about 20 microns.

6. A laser processing method for forming bores onto a micro lens as defined in claim 1, wherein said energy absorbing layer is diffused into said second end of the micro lens to a depth of about 5 microns.

7. A laser processing method for forming bores onto a micro lens as defined in claim 1, wherein the ion exchanging process is conducted in a molten salt solution at a temperature of about 300° C.

8. A laser processing method for forming bores onto a plate shaped micro lens having a first and second side surface, which has one or plural lens portions so that almost all of an incident light entering in parallel at the first side surface is focused onto the second side surface thereof, comprising steps of:

forming a laser energy absorbing layer internally to said micro lens at said second side surface by diffusing said energy absorbing layer a predetermined distance into said micro lens using an ion exchanging process;

irradiating and focusing a laser beam onto the first side surface of said micro lens, the strength of said laser beam being higher than a threshold value sufficient for causing fusion, evaporation or ablation of a glass material comprising the micro lens;

focusing the laser beam onto an optical axis on the second side surface of the micro lens in the laser energy absorbing layer; and forming at least one bore by causing the fusion, evaporation or ablation at the optical axis on said second side surface of the micro lens.

9. A laser processing method for forming bores onto a micro lens as defined in claim 8, wherein said bores have a depth of about 6 microns and a diameter of about 20 microns.

10. A laser processing method for forming bores onto a micro lens as defined in claim 8, wherein said energy absorbing layer is diffused into said second side surface of the micro lens to a depth of about 5 microns.

11. A laser processing method for forming bores onto a micro lens as defined in claim 8, wherein the ion exchanging process is conducted in a molten salt solution at a temperature of about 300° C.

\* \* \* \* \*